US011877707B2

(12) United States Patent
Simek et al.

(10) Patent No.: US 11,877,707 B2
(45) Date of Patent: Jan. 23, 2024

(54) SHOWER DOOR ASSEMBLY

(71) Applicant: LIBERTY HARDWARE MFG. CORP., Winston-Salem, NC (US)

(72) Inventors: Thomas Simek, Winston-Salem, NC (US); Nathaniel Faltin Dutton Schultz, Charlotte, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 87 days.

(21) Appl. No.: 17/383,747

(22) Filed: Jul. 23, 2021

(65) Prior Publication Data

US 2022/0022701 A1 Jan. 27, 2022

Related U.S. Application Data

(60) Provisional application No. 63/056,053, filed on Jul. 24, 2020.

(51) Int. Cl.
*A47K 3/34* (2006.01)
*E05D 15/06* (2006.01)

(52) U.S. Cl.
CPC .............. *A47K 3/34* (2013.01); *E05D 15/063* (2013.01); *E05D 15/0656* (2013.01); *E05Y 2900/114* (2013.01)

(58) Field of Classification Search
CPC ................................ A47K 3/34; E05D 15/063
See application file for complete search history.

(56) References Cited

U.S. PATENT DOCUMENTS

| | | | | |
|---|---|---|---|---|
| 2,939,167 | A | 6/1960 | Preston | |
| 3,298,056 | A | 1/1967 | Hentzi | |
| 4,445,239 | A * | 5/1984 | Jacobsen | A47K 3/34 4/607 |
| 4,785,485 | A * | 11/1988 | Etesam | A47K 3/34 49/404 |
| 5,598,666 | A | 2/1997 | Kurth | |
| 5,778,463 | A | 7/1998 | Teckchandani et al. | |
| 6,023,794 | A | 2/2000 | Nein | |
| 6,381,904 | B1 | 5/2002 | Tedescucci | |
| 7,059,017 | B1 | 6/2006 | Rosko et al. | |
| 7,174,944 | B1 * | 2/2007 | Clark | E05D 15/08 49/424 |

(Continued)

FOREIGN PATENT DOCUMENTS

| | | |
|---|---|---|
| CN | 203308297 U | 11/2013 |
| CN | 204002222 U | 12/2014 |

(Continued)

OTHER PUBLICATIONS

US 10,006,234 B2, 06/2018, Minkovich et al. (withdrawn)

*Primary Examiner* — Jeremy Carroll
(74) *Attorney, Agent, or Firm* — Brooks Kushman P.C.; Lora Graentzdoerffer

(57) ABSTRACT

A shower door assembly is provided with a shower door pane, and a track with a side opening. A pair of wheels is mounted for rotation upon the shower door pane. Each of the pair of wheels is sized to be received in the track for translation along the track. A diameter of each of the pair of wheels is greater than a vertical dimension of the side opening to prevent removal of the pair of wheels from the track while in a vertical orientation, and to permit the pair of wheels to be removed in an angled orientation.

20 Claims, 6 Drawing Sheets

(56) References Cited

U.S. PATENT DOCUMENTS

| | | | |
|---|---|---|---|
| 9,364,121 | B2 | 6/2016 | Sprague |
| 9,486,114 | B2 | 11/2016 | Ball et al. |
| 9,743,810 | B2 | 8/2017 | Schultz et al. |
| 9,974,415 | B2 | 5/2018 | Ball et al. |
| 9,980,614 | B2 | 5/2018 | Austin, III et al. |
| 10,024,093 | B2 | 7/2018 | Schultz et al. |
| 10,028,623 | B1 | 7/2018 | Smith et al. |
| 10,036,190 | B2 | 7/2018 | Minkovich et al. |
| D833,263 | S | 11/2018 | Minkovich et al. |
| 10,123,660 | B2 | 11/2018 | Ball et al. |
| 10,206,542 | B2 | 2/2019 | Minkovich et al. |
| 10,213,059 | B2 | 2/2019 | Ball et al. |
| 10,253,537 | B2 | 4/2019 | Kreyenborg |
| 10,280,666 | B2 | 5/2019 | Schultz et al. |
| 10,327,598 | B2 | 6/2019 | Ball et al. |
| 10,610,060 | B2 | 4/2020 | Ball et al. |
| 10,758,092 | B2 | 9/2020 | Whitaker |
| 2008/0000158 | A1* | 1/2008 | Ranelli .................... A47K 3/34 49/425 |
| 2009/0145039 | A1 | 6/2009 | Shehoski |
| 2017/0022748 | A1 | 1/2017 | Ball et al. |
| 2017/0027388 | A1* | 2/2017 | Schultz ............... E05D 15/0678 |
| 2017/0196412 | A1* | 7/2017 | Jacob .................. E05D 15/0656 |
| 2017/0254130 | A1* | 9/2017 | Cano ........................ A47K 3/34 |
| 2019/0357733 | A1 | 11/2019 | Romero |
| 2020/0149332 | A1 | 5/2020 | Cano et al. |

FOREIGN PATENT DOCUMENTS

| | | | |
|---|---|---|---|
| CN | 205918332 | U | 2/2017 |
| CN | 110199077 | A | 9/2019 |
| DE | 102009041496 | A1 | 4/2010 |
| EP | 2664262 | B1 | 9/2017 |
| EP | 3216376 | A1 | 9/2017 |
| EP | 3295849 | B1 | 4/2020 |
| GB | 2500004 | B | 9/2013 |

* cited by examiner

SHOWER DOOR ASSEMBLY

CROSS-REFERENCE TO RELATED APPLICATIONS

This application claims the benefit of U.S. provisional application Ser. No. 63/056,053 filed Jul. 24, 2020, the disclosure of which is hereby incorporated in its entirety by reference herein.

TECHNICAL FIELD

Various embodiments relate to shower door assemblies.

BACKGROUND

A shower door guide assembly is disclosed in Schultz et al., U.S. Pat. No. 9,743,810 B2, which issued to Liberty Hardware Mfg. Corp., on Aug. 29, 2017.

SUMMARY

According to an embodiment, a shower door assembly is provided with a shower door pane and a track with a side opening. A pair of wheels is mounted for rotation upon the shower door pane. Each of the pair of wheels is sized to be received in the track for translation along the track. A diameter of each of the pair of wheels is greater than a vertical dimension of the side opening to prevent removal of the pair of wheels from the track while in a vertical orientation, and to permit the pair of wheels to be removed in an angled orientation.

According to a further embodiment, the track has a continuous cross-section along a length of the track.

According to an even further embodiment, the track has the continuous cross-section along the length without assembly notches formed through the track.

According to another further embodiment, the track is formed as a unitary component.

According to another further embodiment, the angled orientation for removal of the pair of wheels from the side opening of the track is up to thirty degrees offset.

According to another further embodiment, the side opening provides access to a channel which provides a track guide for receipt of the pair of wheels.

According to an even further embodiment, the track is provided with an overhang portion to bound a limit of the side opening.

According to an even further embodiment, the overhang portion is sized to provide a cavity within the track spaced apart from, and opposed to, the channel.

According to another further embodiment, a bracket is attached to an upper end of the shower door pane. At least one of the pair of wheels is attached to the bracket.

According to an even further embodiment, a post is attached to the bracket to space the at least one wheel away from the bracket.

According to an even further embodiment, a dimension between the post and the at least one wheel provides a limit to a range of vertical translation of the at least one wheel.

According to an even further embodiment, a guide is sized to receive the shower door pane for translation therethrough. The guide prevents rotation of the shower door pane relative to the track.

According to an even further embodiment, the guide overlaps the shower door pane by a dimension that is greater than the limit to the range of vertical translation of the at least one wheel.

According to another further embodiment, the guide overlaps the shower door pane at every position within a range of traverse translation of the shower door pane along the track.

According to an even further embodiment, the bracket has a plurality of mounting positions to permit vertical adjustment of the shower door pane relative to the guide. A range of adjustment of the bracket provides the overlap of the guide and the shower door pane by the dimension that is greater than the limit to the range of vertical translation of the at least one wheel.

According to another further embodiment, a second track is spaced apart from the first track. The guide is installed on the second track.

According to an even further embodiment, a fastener cap encloses a fastener that attaches the guide to the second track.

According to another embodiment, a shower door assembly is provided with a shower door pane and a track with a side opening. A pair of posts is connected to the shower door pane. A pair of wheels are each mounted for rotation upon one of the pair of posts. Each of the pair of wheels is sized to be received in the track for translation along the track. Limited clearance for the pair of wheels in the side opening prevents removal of the pair of wheels from the track while in a vertical orientation. A guide is provided at a lower end of the shower door pane and is sized to receive the shower door pane for translation relative thereto. A distance from each post to an outer diameter of the corresponding wheel is less than an overlap between the guide and a bottom of the shower door pane to limit disengagement of the pair of wheels from the track in the vertical orientation.

According to another embodiment, a method to assemble a shower door assembly installs a track to a shower stall. A shower door pane is angled away from a vertical orientation. Wheels of the shower door pane are installed into the track. The shower door pane is pivoted to the vertical orientation. A guide is installed to limit the shower door pane to the vertical orientation to avoid removal of the shower door pane from the track.

According to a further embodiment, the shower door pane is lowered by a first dimension until the wheels engage a channel in the track before installing the guide. The guide is installed to overlap the shower door pane by a second dimension that is greater than the first dimension.

According to another further embodiment the shower door pane is angled up to thirty degrees away from the vertical orientation.

BRIEF DESCRIPTION OF THE DRAWINGS

FIG. 2 is a side elevation view of an upper region of the shower door assembly of FIG. 1, illustrating another installation step;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 3:
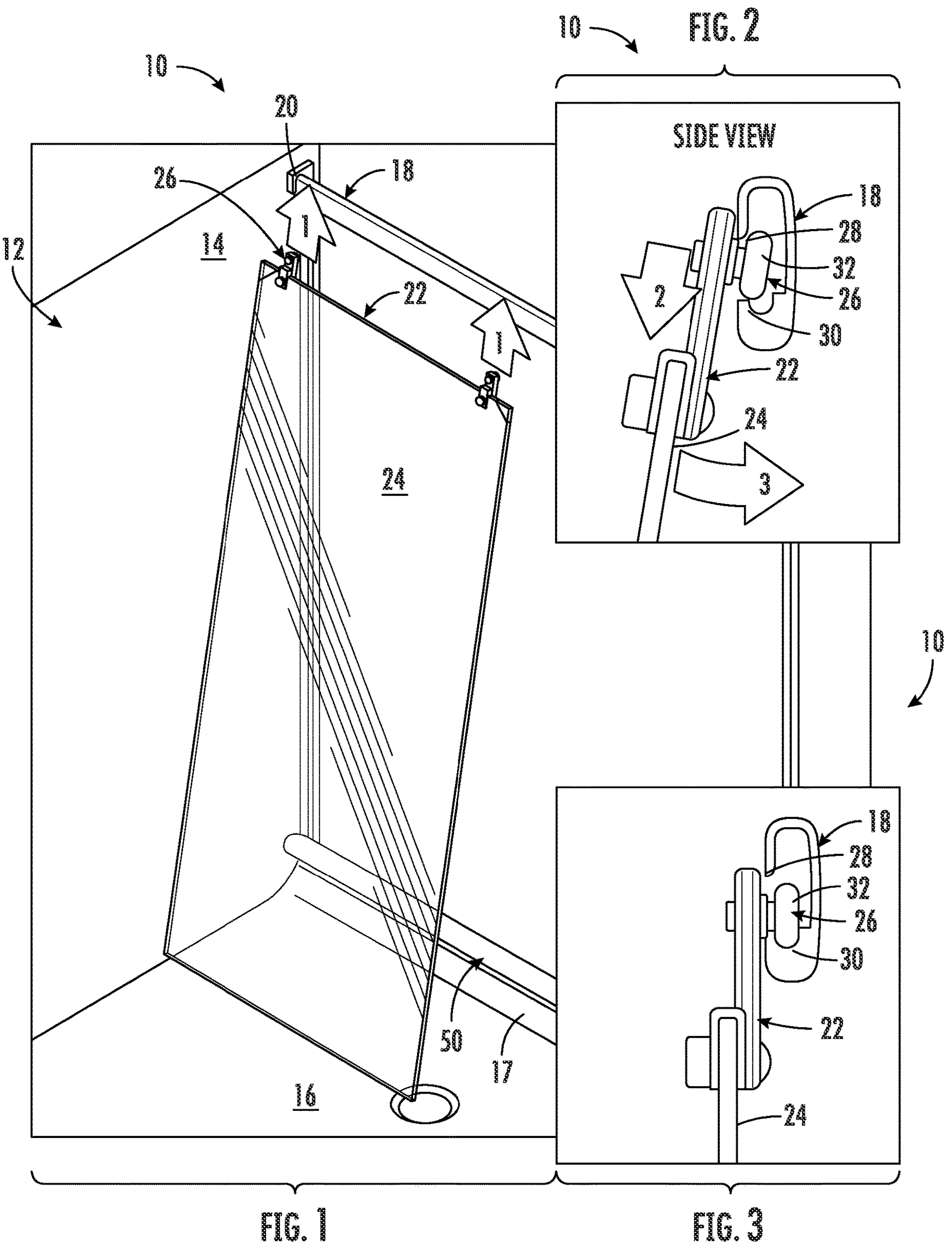
FIG. 1 is a perspective view of a shower door assembly according to an embodiment, illustrating an installation step.
FIG. 3 is another side elevation view of the upper region of the shower door assembly of FIG. 1.

FIG. 1 illustrates a shower door assembly 10 according to an embodiment. The shower door assembly 10 is illustrated during installation into a shower stall 12. The shower stall 12 includes a pair of sidewalls 14 and a floor 16. The shower stall 12 may also include a sill 17 extending up from the floor 16. The shower door assembly 10 includes a top track 18 that is installed to the pair of sidewalls 14 to span a length between the sidewalls 14. The shower door assembly 10 may include a pair of track brackets 20 that are fastened to the sidewalls 14 to support the top track 18.

A first shower door subassembly 22 is provided to be installed upon the top track 18 to translate relative to the top track 18. The first shower door subassembly 22 includes a shower door pane 24, which may be formed from tempered glass or any suitable material. The shower door pane 24 has a width that is less than a length of the top track 18 in order to translate the shower door pane 24 for ingress and egress of an occupant into and out of the shower stall 12.

The first shower door subassembly 22 includes a pair of roller assemblies 26 mounted to an upper region of the shower door pane 24. The roller assemblies 26 support the shower door pane 24 upon the top track 18. The roller assemblies 26 cooperate with the top track 18 to support the roller assemblies 26 and the shower door pane 24 upon the top track 18, while permitting translation of the first shower door subassembly 22 along the top track 18.

FIG. 1 illustrates the first shower door subassembly 22 during installation. The first shower door subassembly 22 is illustrated within the shower stall 12 and angled offset from vertical to approach an installation of the roller assemblies 26 upon the top track 18 by lifting in a direction of arrows labeled 1. FIG. 2 illustrates an upper region of the shower door assembly 10. The top track 18 includes a side opening 28 for access to a channel 30, which provides a track guide. The roller assemblies 26 each include a wheel 32 projecting from the shower door pane 24. The wheel 32 is sized to be inserted through the side opening 28 of the top track 18 to then rest upon the channel 30. Once the wheels 32 are inserted into the side openings 28, then the first shower door subassembly 22 is lowered in the direction of labeled arrow 2, and pivoted in a direction of labeled arrow 3 so that the wheels 32 are received in the channel 30 as illustrated in FIG. 3.

Figure 4:
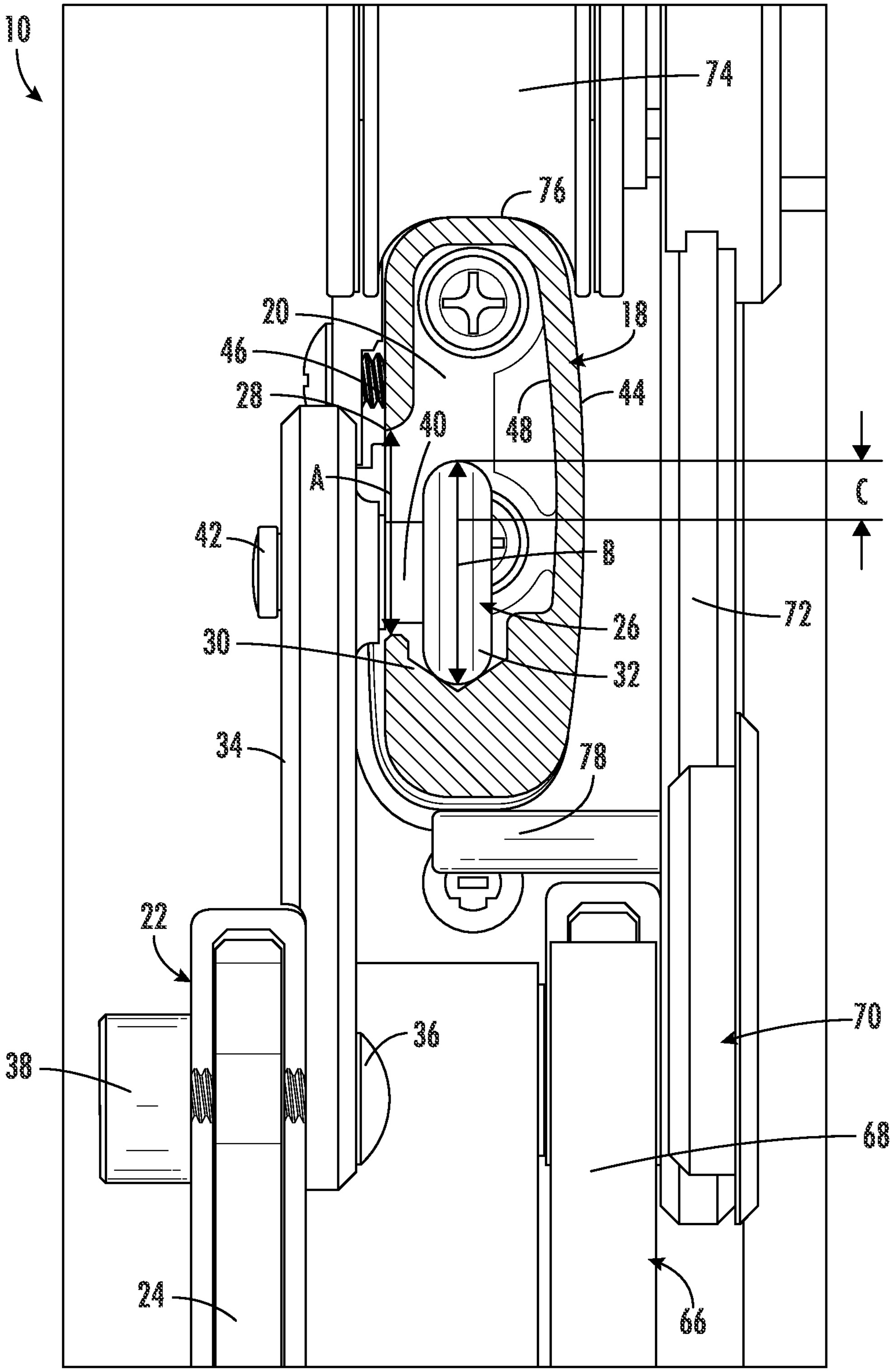
FIG. 4 is another side elevation view of the upper region of the shower door assembly of FIG. 1.

FIG. 4 illustrates the upper region of the shower door assembly 10 for greater detail. The roller assembly 26 includes a bracket 34 fastened to an upper end the shower door pane 24 by fasteners 36, 38. A post 40 is fastened to the roller bracket 34 by a fastener 42. The post 40 spaces the wheel 32 away from the roller bracket 34 to extend through the side opening 28 and into the top track 18 for contact upon the channel 30.

As illustrated in FIG. 4, the side opening 28 of the top track 18 has a vertical dimension labeled A. The wheel 32 has an outside diameter, which is labeled B. The wheel 32 diameter B is larger than the vertical dimension A of the side opening 28. The limited clearance of the side opening 28 retains the wheel 32 within a cavity 48 in the top track 18, and prevents disassembly of the first shower door subassembly 22 from the top track 18 in the vertical orientation of the shower door pane 24.

Figure 5:
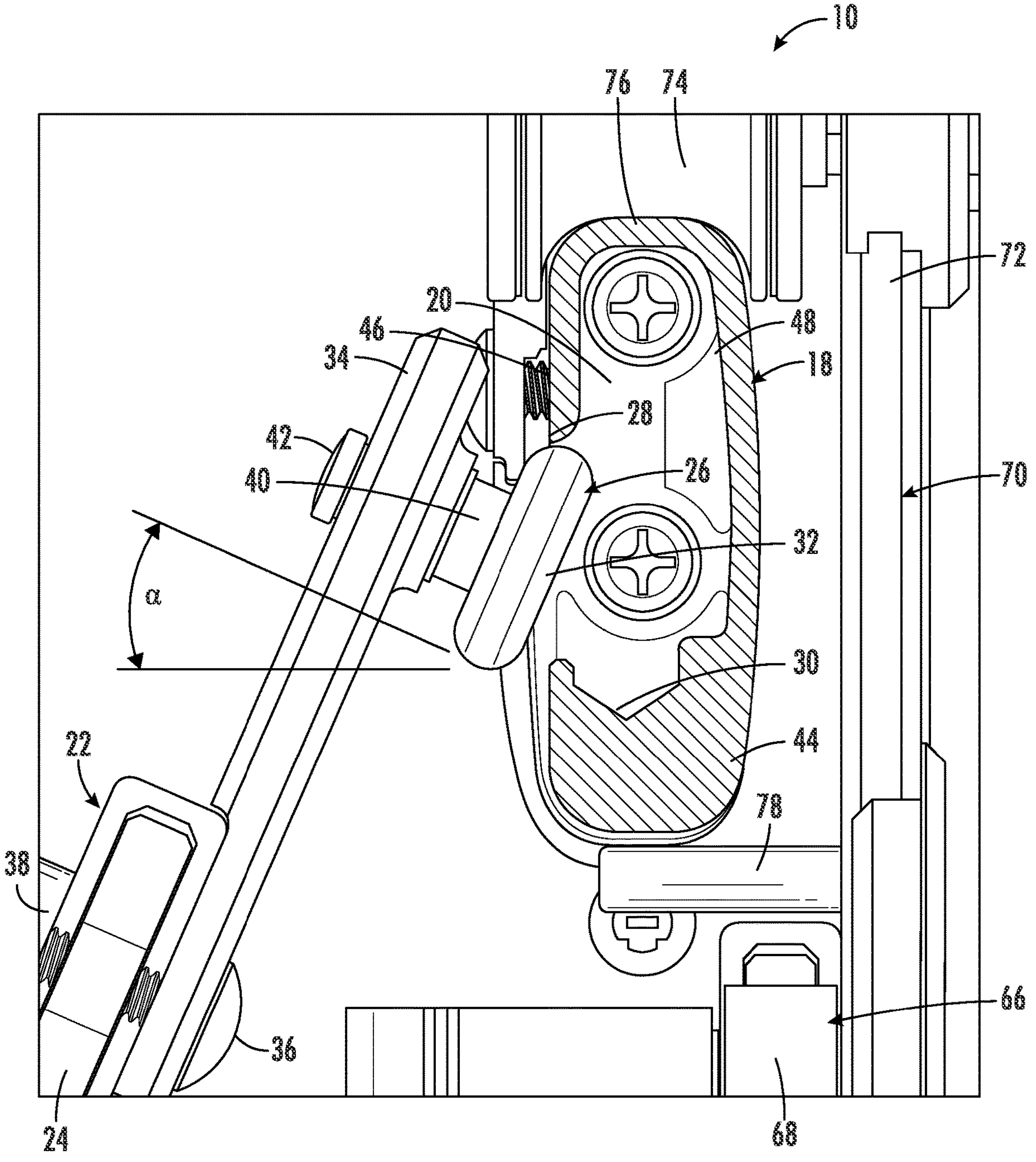
FIG. 5 is a side elevation view of the upper region of the shower door assembly of FIG. 1, illustrated another installation step.

In order to install the first shower door subassembly 22, the shower door subassembly 22 is pivoted to an angle α as illustrated in FIG. 5 so that the wheel 32 can pass through the restricted side opening 28. The angle α is illustrated as an offset of the wheel 32 from horizontal, but also consequently represents a pivotal angle of the shower door pane 24 from vertical. The angle α is designed so that the shower door pane 24 must be pivoted significantly in order to disassemble the shower door subassembly 22 from the top track 18.

Top tracks 18 are often installed with the side opening 28 facing into the shower stall 12 to provide a consistent and uninterrupted outer face 44 to be viewed externally. Therefore, the first shower door subassembly 22 may often be installed as an inner shower door subassembly 22 that is installed from within the shower stall 12 as illustrated in FIG. 1. The angle α is limited to avoid inconveniences during the installation, due to the depth of shower stalls 12. A suitable range for the angle α may be up to thirty degrees. A suitable approach angle α for the installation of the first shower door subassembly 22 is thirteen degrees.

Referring again to FIG. 4, the top track 18 includes an overhang portion 46, which bounds an upper limit of the side opening 28. The cavity 48 is provided in an upper region of the top track 18 to permit vertical translation of the wheel 32 relative to the top track 18 for maneuvering, such as lifting (motion 1 in FIG. 1), pivoting (motion 3 in FIG. 2) and lowering (motion 2 in FIG. 2), during installation. As illustrated in FIG. 4, a distance between a top of the post 40 and a top of the wheel 32 is C. The dimension C represents a range of vertical translation permitted by the roller assemblies 26, while the wheels 32 are received in the top track 18.

With reference again to FIG. 1, the shower door assembly 10 includes a lower track 50 that is installed between the sidewalls 14 adjacent to the shower floor 16. In the depicted embodiment, the lower track 50 is installed upon the sill 17. The lower track 50 is illustrated in greater detail in FIG. 6. A center guide 52 is installed upon lower track 50. The center guide 52 includes a central divider 54. The center guide 52 also includes an inner retainer 56 with a channel 58 between the inner retainer 56 and the central divider 54. The channel 58 is sized to receive a lower end of the shower door pane 24 to prevent rotation of the shower door pane 24 relative to the top track 18.

Figure 6:
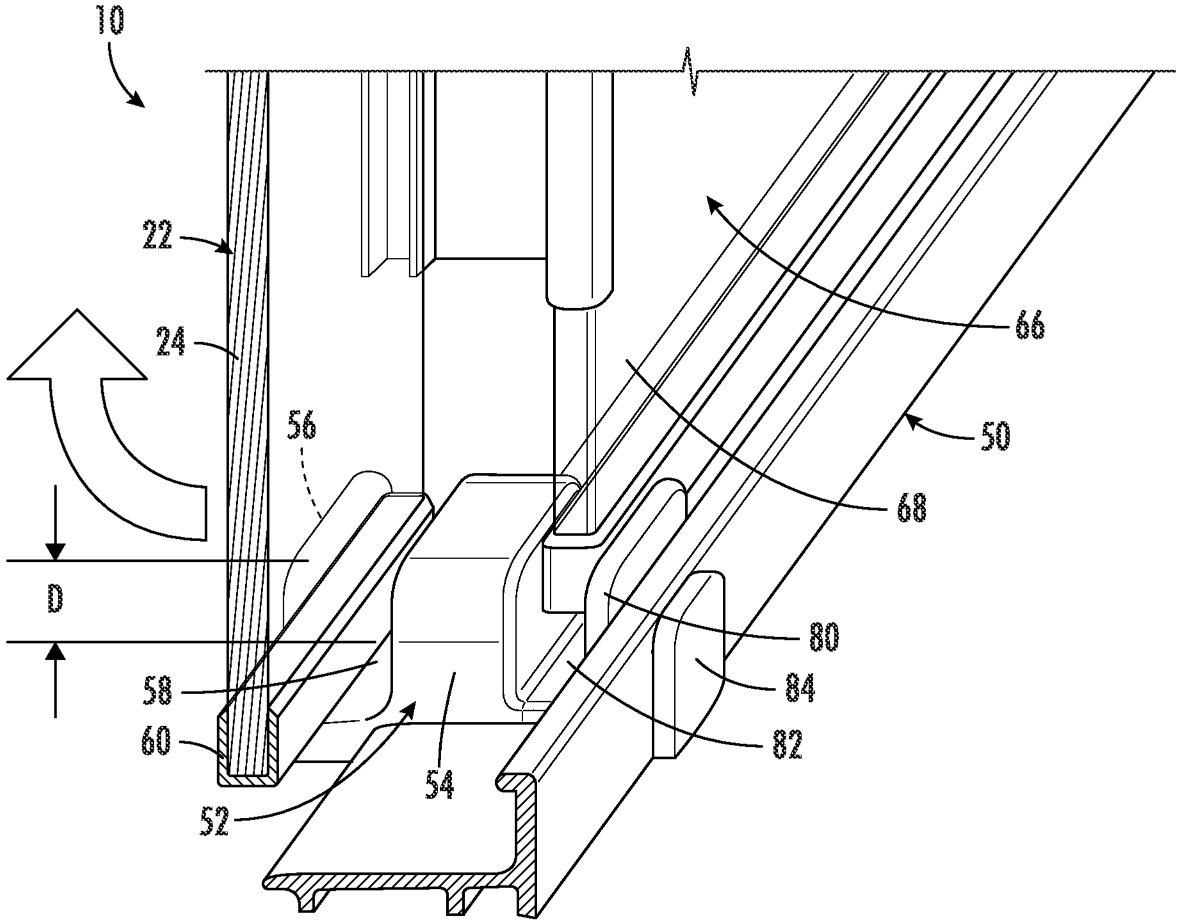
FIG. 6 is a side perspective view of the lower region of the shower door assembly of FIG. 1.

With continued reference to FIG. 6, the inner retainer 56 overlaps the shower door pane 24 by a dimension labeled D, from a top of the retainer 56 to the bottom of the shower door pane 24. The overlap D is designed to be larger than dimension C (FIG. 4) so that the if the shower door subassembly 22 is lifted the dimension C, the lower end of the shower door pane 24 is still retained within the channel 58. The overlap D (FIG. 6) prevents the first shower door subassembly 22 from being pivoted relative to the top track 18, which may consequently result in disassembly of the shower door assembly 10.

For the depicted embodiment, the first shower door subassembly 22 includes an optional trim member 60 along a lower portion of the shower door pane 24. The dimension D is measured from the lower dimension of the trim member 60, which adds to the overlap between the shower door pane 24 and the inner retainer 56. Likewise, the dimension D includes a lowermost point of any components that may be installed upon the shower door pane 24 that add to the overlap.

Figures 7, 8:
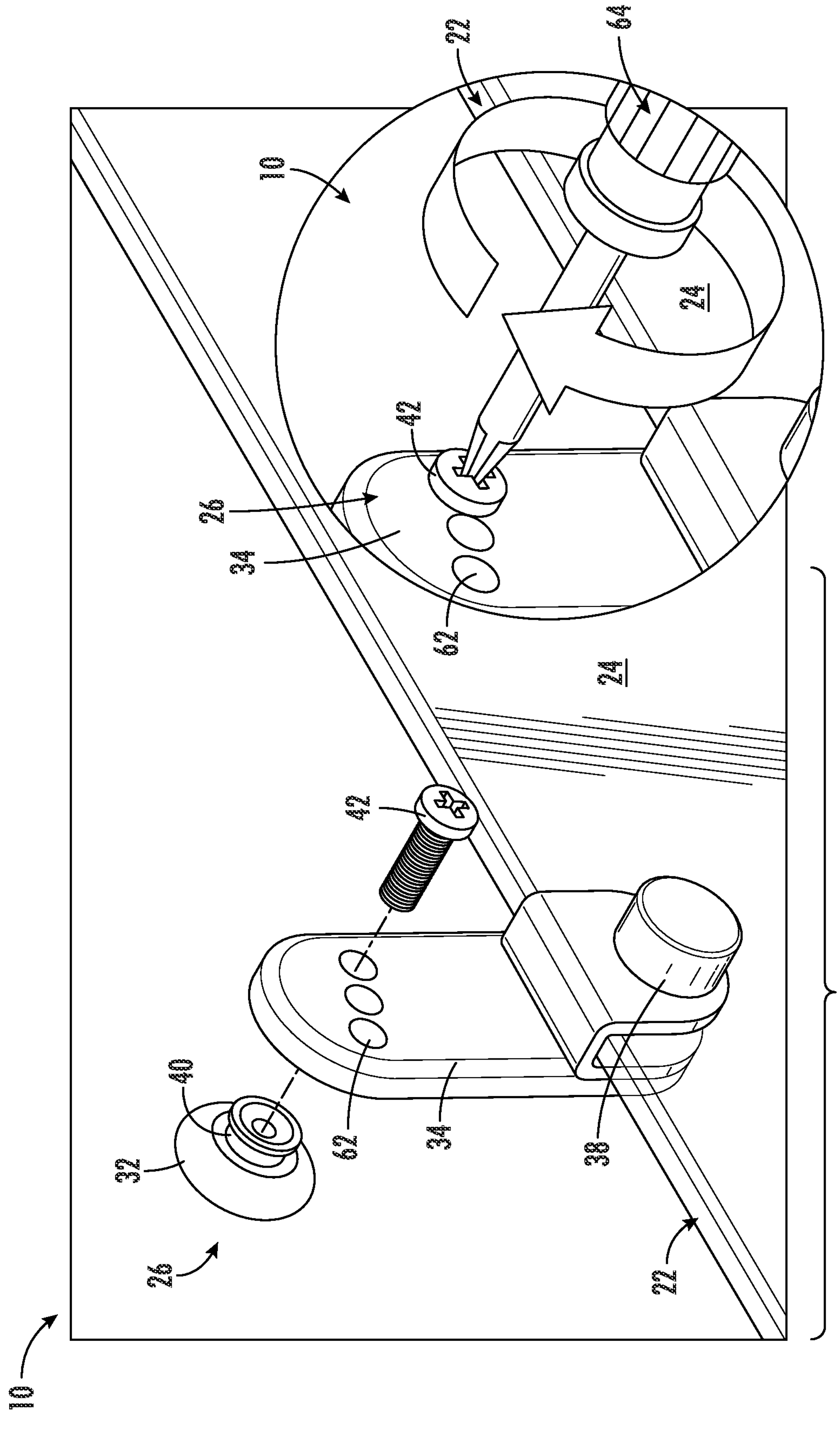
FIG. 7 is an exploded perspective view of the upper region of the shower door assembly of FIG. 1, illustrating another installation step.
FIG. 8 is a perspective view of the upper region of the shower door assembly of FIG. 1, illustrating another installation step.

FIG. 7 illustrates the roller bracket 34 has a plurality of apertures 62 according to an optional embodiment. In Figure, 7, the plurality of apertures 62 are oriented at various elevations relative to the shower door pane 24. Each of the apertures 62 is sized to receive the fastener 42 thereby permitting vertical adjustment at installation of the shower door pane 24 relative to the center guide 52 to avoid any interference of the shower door pane 24 within the center guide 52. FIG. 8 illustrates manual installation with a tool 64 of the fastener 42 through one of the apertures 62, and consequently into the post 40 of the roller assembly 26. Installation in the lowermost aperture 62 minimizes the dimension of the overlap D, while installation in the uppermost aperture maximizes the dimension of the overlap D. The overlap D is designed to exceed the dimension C at the lowermost aperture 62 illustrated in FIG. 8.

The shower door assembly 10 incorporates structural conditions through the use of geometric restrictions and sequentially ordered assembly methods such that no additional components or fixtures are necessary to fully retain the wheels 32 of a shower door subassembly 22 into the top track 18. The inability of the shower door subassembly 22 to be removed from the assembled shower door assembly 10 by accident is often referred to as an anti jump mechanism. This terminology comes from the characterization of a roller assembly 26 "jumping" off, or out of, the channel 30 of the top track 18. The prior art has offered additional structural components added to the shower door assemblies 10 to prevent inadvertent disassembly. By control of geometries, dimensions and assembly sequences, additional hardware is omitted thereby reducing cost, simplifying installation, and improving aesthetics of the shower door assembly 10.

During installation, the top track 18 and the bottom track 50 are installed. The first shower door subassembly 22 can be installed to the top track 18 first if installed as the inner door as illustrated, to take advantage of the full opening of the shower stall 12, between the sidewalls 14. After the first shower door subassembly 22 is installed, an outer shower door subassembly 66 is installed as a second shower door subassembly 66 to the top track 18.

The second shower door subassembly 66 is illustrated in FIGS. 4-6. The second shower door subassembly 66 includes a shower door pane 68 fastened to a pair of roller assemblies 70, which are illustrated in FIGS. 4 and 5. The roller assemblies 70 include a roller bracket 72 that supports a concave wheel 74. The concave wheel 74 is oriented upon a top surface 76 of the top track 18 to roll along the top track 18. The top track 18 is designed to provide an upper guide at the top surface 76 for the concave wheels 74. A pin 78 is installed in the roller assembly 70 to prevent the roller assembly 70 from being raised and disassembled from the top track 18.

Referring now to FIG. 6, after both shower door subassemblies 22, 66 are installed to the top track 18, then the center guide 52 is installed. Both shower door subassemblies 22, 66 are slid away from one of the sidewalls 14 of the shower stall 12. The center guide 52 includes an outer retainer 80 with a channel 82 formed between the outer retainer 80 and the divider 54. The divider 54 separates the shower door subassemblies 22, 66. The outer retainer 80 retains the shower door pane 68 within the channel 82 to prevent rotation of the second shower door subassembly 66 relative to the top track 18.

The center guide 52 is slid beneath the first and second shower door subassemblies 22, 66. According to an embodiment, each shower door pane 24, 68 may be sized with a width which causes the shower door panes 24, 68 to overlap at a center of the lower track 50 at any position of the shower door subassemblies 22, 66 once the shower door subassemblies 22, 66 are fully installed. The center guide 52 is slid to a center position upon the lower track 50. Then the center guide 52 is fastened to the lower track 50 to affix the center guide 52 to the central position. According to an embodiment, the installer may drill an aperture in the lower track 50, and then install a fastener into the lower track 50 and the center guide 52. According to an optional embodiment, a fastener cap 84 may be provided to affix to the lower track 50 to cover the drilled aperture and the fastener.

Figure 9:
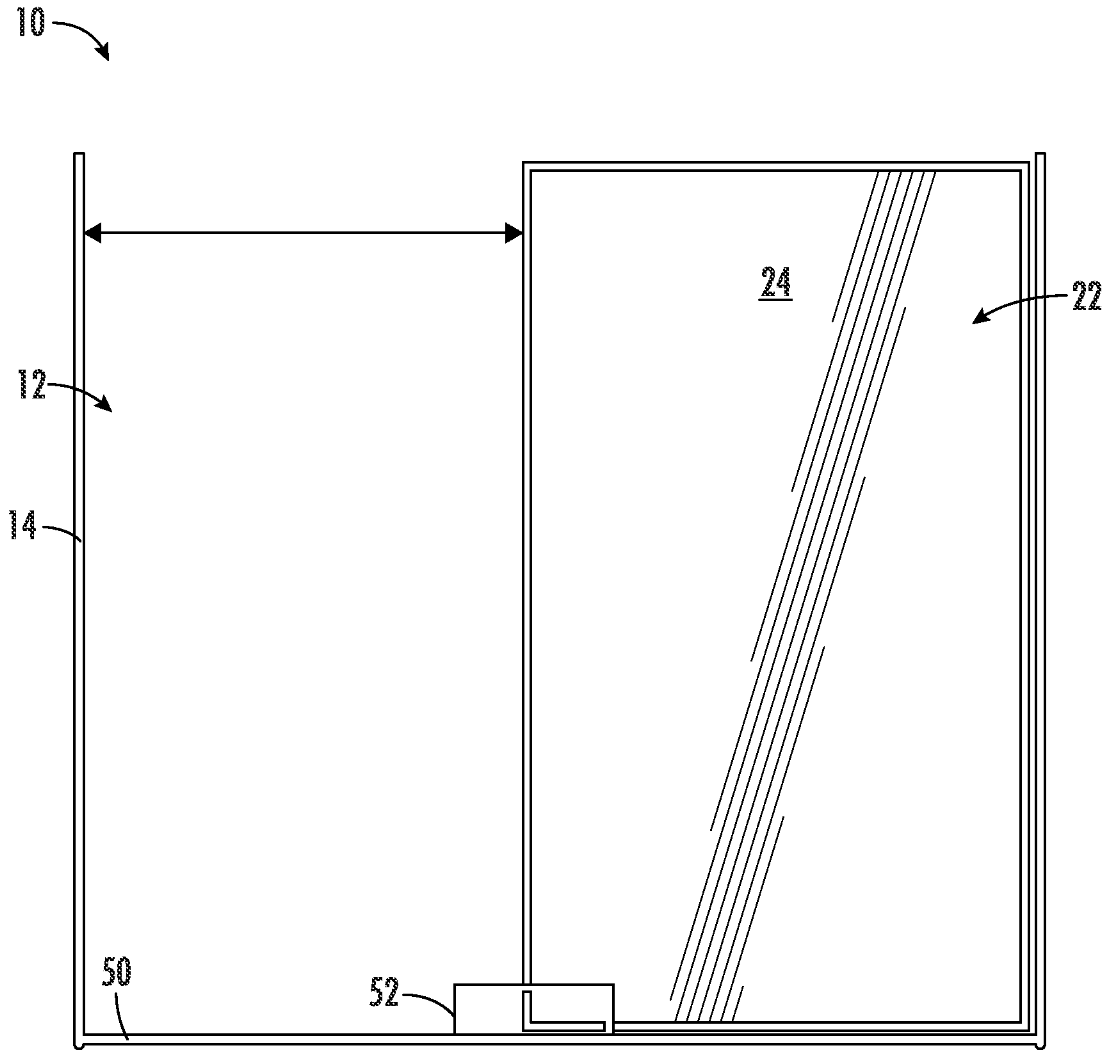
FIG. 9 is a front elevation schematic view of the shower door assembly of FIG. 1, according to an embodiment.

FIG. 9 depicts a schematic view of the shower door assembly 10. Once assembled, the shower door pane 24 has a width that overlaps a central position anywhere in a range of traverse travel (indicated by the arrow in the Figure). Therefore, the shower door pane 24 maintains cooperation within the central guide 52 at any position along the range of travel of the shower door pane 24. Likewise, the center guide 52 has a width sized to maintain suitable contact with the shower door pane 24. The center guide 52 prevents pivoting of the shower door pane 24 at any position of the shower door pane 24.

In order to disassemble the shower door assembly 10, the center guide 52 is first removed before the first shower door subassembly 22 can be pivoted to remove the wheels 32 from the top track 18.

According to another embodiment, the center guide 52 can be installed prior to the second shower door subassembly 66. For example, the top and bottom tracks 18, 50 are installed to the shower stall 12 between the sidewalls 14. Then, the first shower door subassembly 22 is installed upon the top track 18. Next, the center guide 52 is installed upon the lower track 50 in cooperation with the first shower door subassembly 22. The second shower door subassembly 66 can then be installed to the top track 18 and the center guide 52. Then the pin 78 can be installed to retain the second shower door subassembly 66 upon the top track 18.

According to another embodiment, the second shower door subassembly 66 may be a fixed panel 66 instead of a sliding bypass panel 66. In this embodiment, the bottom track 50 is installed into the shower stall 12. Then, the fixed panel 66 is installed to the bottom track 50. Next, the top track 18 is installed into the shower stall 12 in cooperation across the fixed panel 66. Next, the first shower door subassembly 22 is installed as a sliding bypass panel upon the top track 18, which may be an inner door subassembly 22. Next, the center guide 52 is installed upon the lower track 50 to retain the first shower door subassembly 22 upon the top track 18. Alternatively, the fixed panel 66 is installed onto the floor or the sill 17 without mounting to a bottom track 50. In this embodiment, the center guide 52 may be installed directly to the shower floor 16 or to the sill 17 to cooperate with retaining the first shower door subassembly 22 upon the top track 18.

Each of the tracks 18, 50 may be formed from a suitable structural material, such as extruded aluminum, or the like. The tracks 18, 50 may each be formed with a continuous cross-section along the length of the track 18, 50. Due to the retention features described above, the top track 18 is formed with the continuous cross-section without assembly notches formed through the track. Likewise, the top track 18 may be extruded as a unitary component without requiring assembly of multiple components together as a top track.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shower door assembly comprising:

a track with a side opening;

a shower door pane;

a pair of wheels mounted for rotation upon the shower door pane, each of the pair of wheels sized to be received in the track for translation along the track, wherein a diameter of each of the pair of wheels is greater than a vertical dimension of the side opening to prevent removal of the pair of wheels from the track while in a vertical orientation, and to permit the pair of wheels to be removed in an angled orientations;

wherein the side opening provides access to a channel which provides a track guide for receipt of the pair of wheels; and a bracket attached to an upper end of the shower door pane, wherein at least one of the pair of wheels is attached to the bracket such that the bracket and the shower door pane are oriented external of the track.

2. The shower door assembly of claim 1 wherein the track has a continuous cross-section along a length of the track.

3. The shower door assembly of claim 2 wherein the track has the continuous cross-section along the length without assembly notches formed through the track.

4. The shower door assembly of claim 1 wherein the track is formed as a unitary component.

5. The shower door assembly of claim 1 wherein the angled orientation for removal of the pair of wheels from the side opening of the track is up to thirty degrees offset.

6. The shower door assembly of claim 1 wherein the track comprises an overhang portion to bound a limit of the side opening.

7. The shower door assembly of claim 6 wherein the overhang portion is sized to provide a cavity within the track spaced apart from, and opposed to, the channel.

8. The shower door assembly of claim 1 further comprising a post attached to the bracket to space the at least one wheel away from the bracket.

9. The shower door assembly of claim 8 wherein a dimension between the post and the at least one wheel provides a limit to a range of vertical translation of the at least one wheel.

10. The shower door assembly of claim 9 further comprising a guide sized to receive the shower door pane for translation therethrough, wherein the guide prevents rotation of the shower door pane relative to the track.

11. The shower door assembly of claim 10 wherein the guide overlaps the shower door pane by a dimension that is greater than the limit to the range of vertical translation of the at least one wheel.

12. The shower door assembly of claim 11 wherein the bracket has a plurality of mounting positions to permit vertical adjustment of the shower door pane relative to the guide; and wherein a range of adjustment of the bracket provides the overlap of the guide and the shower door pane by the dimension that is greater than the limit to the range of vertical translation of the at least one wheel.

13. The shower door assembly of claim 10 wherein the guide overlaps the shower door pane at every position within a range of traverse translation of the shower door pane along the track.

14. The shower door assembly of claim 10 further comprising a second track spaced apart from the first track, wherein the guide is installed on the second track.

15. The shower door assembly of claim 9 wherein the track comprises an overhang portion to bound a limit of the side opening; and wherein the dimension between the post and the at least one wheel is less than a dimension between the post and the overhang portion to limit the range of vertical translation of the at least one wheel.

16. The shower door assembly of claim 1 wherein the side opening faces an inner side of the shower door assembly; and wherein the shower door pane is further defined as an inner shower door pane provided on the inner side of the track.

17. The shower door assembly of claim 16 further comprising an outer shower door pane; and a second pair of wheels mounted for rotation upon the outer shower door pane, each of the second pair of wheels sized to be received upon a top surface of the track for translation along the track and to orient the outer shower door pane at an outer side of the track, spaced apart from the inner shower door pane.

18. A shower door assembly comprising:

a track with a side opening;

a shower door pane;

a pair of posts connected to the shower door pane;

a pair of wheels each mounted for rotation upon one of the pair of posts, each of the pair of wheels sized to be received in the track for translation along the track, wherein limited clearance for the pair of wheels in the side opening prevents removal of the pair of wheels from the track while in a vertical orientation; and a guide provided at a lower end of the shower door pane and sized to receive the shower door pane for translation relative thereto; and wherein a distance from each post to an outer diameter of the corresponding wheel is less than an overlap between the guide and a bottom of the shower door pane to limit disengagement of the pair of wheels from the track in the vertical orientation.

19. The shower door assembly of claim 18 wherein the side opening faces an inner side of the shower door assembly;

wherein the shower door pane is further defined as an inner shower door pane provided on the inner side of the track;

wherein the shower door assembly further comprises:

an outer shower door pane, and a second pair of wheels mounted for rotation upon the outer shower door pane, each of the second pair of wheels sized to be received upon a top surface of the track for translation along the track and to orient the outer shower door pane at an outer side of the track, spaced apart from the inner shower door pane.

20. A shower door assembly comprising:

a track with a side opening;

a shower door pane;

a pair of wheels mounted for rotation upon the shower door pane, each of the pair of wheels sized to be received in the track for translation along the track, wherein a diameter of each of the pair of wheels is greater than a vertical dimension of the side opening to prevent removal of the pair of wheels from the track while in a vertical orientation, and to permit the pair of wheels to be removed in an angled orientation;

a bracket attached to an upper end of the shower door pane, wherein at least one of the pair of wheels is attached to the bracket;

a post attached to the bracket to space the at least one wheel away from the bracket, wherein a dimension between the post and the at least one wheel provides a limit to a range of vertical translation of the at least one wheel; and a guide sized to receive the shower door pane for translation therethrough, wherein the guide prevents rotation of the shower door pane relative to the track;

wherein the guide overlaps the shower door pane by a dimension that is greater than the limit to the range of vertical translation of the at least one wheel;

wherein the bracket has a plurality of mounting positions to permit vertical adjustment of the shower door pane relative to the guide; and wherein a range of adjustment of the bracket provides the overlap of the guide and the shower door pane by the dimension that is greater than the limit to the range of vertical translation of the at least one wheel.

* * * * *